(12) United States Patent
Konoe et al.

(10) Patent No.: US 6,319,119 B1
(45) Date of Patent: Nov. 20, 2001

(54) GAME MACHINE AND INFORMATION STORAGE MEDIUM

(75) Inventors: Yutaka Konoe; Tatsuhiko Mochizuki, both of Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/555,380

(22) PCT Filed: Oct. 1, 1999

(86) PCT No.: PCT/JP99/05417

§ 371 Date: Jul. 10, 2000

§ 102(e) Date: Jul. 10, 2000

(30) Foreign Application Priority Data

Oct. 2, 1998 (JP) .................................................. 10-296074

(51) Int. Cl.[7] .............................. A63F 9/24; A63F 13/00
(52) U.S. Cl. .................................... 463/2; 463/30; 463/42; 463/50; 463/52
(58) Field of Search ................................. 463/50, 51, 52, 463/53, 56, 57, 1–5, 30–34; 273/317, 317.1, 348–348.2, 358, 367, 370

(56) References Cited

U.S. PATENT DOCUMENTS 4,799,687 * 1/1989 Davis et al. ......................... 273/312
5,382,026 * 1/1995 Harvard et al. ..................... 273/310

FOREIGN PATENT DOCUMENTS

A-5-177058    7/1993  (JP) .
A-9-164272    6/1997  (JP) .
A-9-253339    9/1997  (JP) .

* cited by examiner

Primary Examiner—Valencia Martin-Wallace
Assistant Examiner—Alex F. R. P. Rada, II
(74) Attorney, Agent, or Firm—Oliff & Berridge, PLC

(57) ABSTRACT

The objective of this invention is to provide a game machine and information storage medium that make it possible for players to perceive which player has succeeded in attacking which target, in a simple manner. When players have launched attacks against a target, attacking player identification information, which is information for identifying which player has succeeded in attacking that target, is associated with that target and is kept and saved. Targets 40-1 and 40-2 that have been hit by shots 32-1 and 32-2 from players 1 and 2 turn red and blue, which are symbolic colors for players 1 and 2, or change shape to symbolic shapes for players 1 and 2. If player 1, whose symbolic color is red, succeeds in attacking a target then player 2, whose symbolic color is blue, succeeds in attacking the same target, the color of the target first changes from a neutral color to red, then to blue. A target which a player has succeeded in attacking is made to fragment and the attacking player identification information is associated with a target created by fragmentation. The attacking player identification information is associated with the target and is kept and saved until the game stage ends.

24 Claims, 17 Drawing Sheets

GAME MACHINE AND INFORMATION STORAGE MEDIUM

TECHNICAL FIELD

This invention relates to a game machine and information storage medium for a multi-player type of game in which a plurality of players attack targets.

BACKGROUND OF ART

Various game machines have been developed and marketed in the past to enable a plurality of player to attack targets in a multi-player type of game. With such a game machine, a player can enjoy a game of attacking a target, while either competing against another player or cooperating there with. That is why these games are popular with players.

There is therefore a problem with this type of game machine in that it is difficult for the players to perceive which player has attacked which target. Consider a case in which a plurality of players fires shots at a target, by way of example. In such a case, it is usual for each player to fire shots wildly at the targets, in order to increase the player's own game score and also increase the player's degree of contribution in cooperative play. At the instant that a shot has hit a target, it is therefore possible to perceive which player fired that shot, to a certain degree, but it is not possible to determine which player has hit which target after a short time has elapsed. It is even more difficult to perceive this when the targets move around after being hit. Each player has no option but to determine his or her own game score and degree of contribution by looking at the score display which is expressed in a numerical or similar fashion.

DISCLOSURE OF INVENTION

The present invention was devised in the light of the above described technical problems and has as an objective thereof the provision of a game machine and information storage medium that make it possible for players to perceive which player has succeeded in attacking which target, in a simple manner.

In order to solve the above technical problems, an aspect of this invention relates to a game machine for a multi-player type of game in which a plurality of players launch attacks against a target, wherein the game machine comprises: means for performing game computations, based on operation data that a player inputs by using an operation means; means for generating a game image in accordance with the game computations; and means that is used when players have launched attacks against a target, for keeping and saving attacking player identification information, which is information for identifying which player has succeeded in attacking the target, associated with the target.

With this aspect of the invention, if a first player succeeds in attacking a first target, attacking player identification information that indicates that the first player has succeeded in attacking that first target is associated with the first target and is kept and saved. Similarly, if a second player succeeds in attacking a second target, attacking player identification information that indicates that the second player has succeeded in attacking that second target is associated with the second target and is kept and saved. This configuration therefore makes it possible for the first and second players to perceive, in a simple and also intuitive manner, which player has succeeded in attacking which target, by checking the attacking player identification information that is associated with the first and second targets. This makes it possible to perceive each player's own game results immediately.

In this invention, the color of a target which a player has succeeded in attacking may change to a symbolic color that has been assigned to that player. This makes it possible to perceive which player has succeeded in attacking which target, in a simple and also intuitive manner, by checking which target has been changed to which color. This also makes it possible to achieve a visual effect that could not be obtained up to now, by staining the targets various different colors.

In this invention, the shape of a target which a player has succeeded in attacking may change to a symbolic shape that has been assigned to that player. This makes it possible to perceive which player has succeeded in attacking which target, in a simple and also intuitive manner, by checking which target has been changed to which shape. This also makes it possible to achieve a visual effect that could not be obtained up to now, by changing the shapes of the targets in various different ways.

In this invention, when one player from among a plurality of players has succeeded in attacking a target and then another player succeeds in attacking the target, the attacking player identification information for the other player may be associated with that target and be kept and saved. This makes it possible to sequentially switch the attacking player identification information, which is kept and saved in association with each target, in answer to the players' attacks, and thus achieve a superlative visual effect.

In this invention, a target which a player has succeeded in attacking may be made to fragment and the attacking player identification information may be associated with a target created by fragmentation and be kept and saved. This makes it possible to increase the number of targets on-screen as the players' attacks proceed, thereby increasing the visual effect of the game images.

In this invention, the attacking player identification information may be associated with a target and is kept and saved until one game stage is completed. This makes it possible to indicate the game score or results within a game stage of each player in a visual manner from the attacking player identification information, when that game stage ends.

BEST MODE FOR CARRYING OUT THE INVENTION

Preferred embodiments of this invention are described below with reference to the accompanying drawings. Note that, although the description below relates to an example in which the present invention is applied to a variety game pack that enables a player to play a plurality of mini-games, the applications of this invention are not specifically limited thereto. Similarly, the description below relates to a game machine that enables two players to play, but this invention is not limited thereto and can equally well apply to a game machine that enables three or more players to play.

1. Configuration

Figure 1:
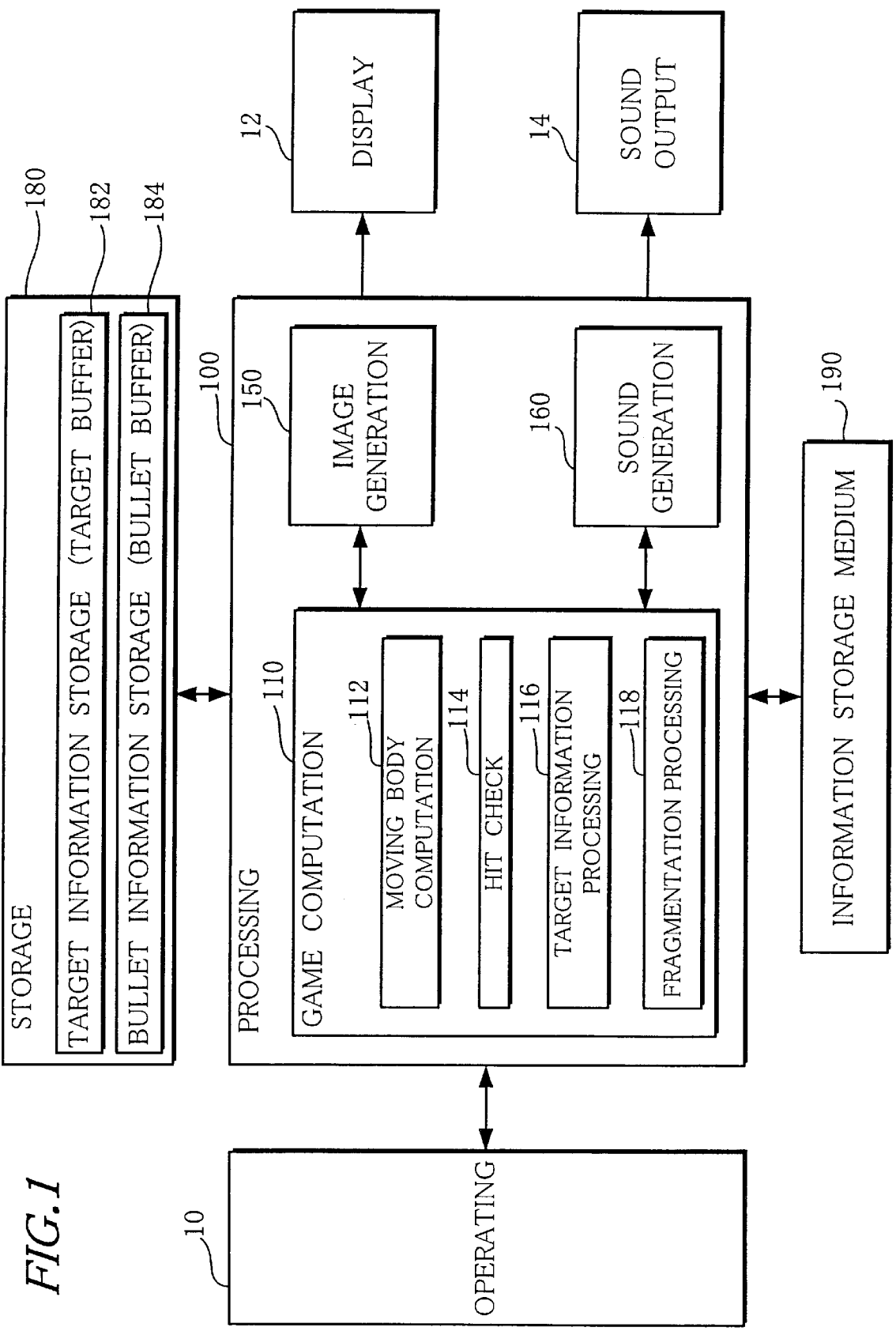
FIG. 1 shows an example of a functional block diagram of a game machine in accordance with this embodiment of the invention.

An example of a functional block diagram of the game machine of this embodiment is shown in FIG. 1.

In this example, an operating section 10 enables a player to input operation data by operating controls such as a joystick, buttons, a shooting device (an input device that simulates a gun or the like), a steering wheel, or an accelerator pedal, and the operation data obtained by the operating section 10 is input to a processing section 100.

The processing section 100 is designed to execute various types of processing, such as controlling the main unit, issuing instructions to the various blocks within the device, and game computations, where the functions thereof can be implemented by hardware such as a CPU (either CISC or RISC), a DSP, or an ASIC (such as a gate array) and by a given program (game program)

A storage section 180 acts as a work area for the processing section 100, for example, where the functions thereof can be implemented by hardware such as RAM.

An information storage medium (a storage medium that enables the reading of information therefrom by a computer) 190 stores information such as a program and data. The functions of this information storage medium 190 can be implemented by hardware such as an optical disk (CD-ROM or DVD), a magneto-optical disk (MO), a magnetic disk, a hard disk, magnetic tape, a game cassette, an IC card, or semiconductor memory. The processing section 100 executes the various processings of this invention, based on information such as the program and data stored in his information storage medium 190.

Note that all or part of the information stored in the information storage medium 190 is transferred to the storage section 180 at a suitable time, such as when the device is switched on.

The processing section 100 comprises a game computation section 110, an image generation section 150, and a sound generation section 160.

In this case, the game computation section 110 executes processing for setting a game mode; processing for moving the game forward; processing for setting selection screens; processing for determining the position and direction of a moving body (such as a character, robot, vehicle, tank, aircraft, spaceship, ship, speedboat, ski, surfboard, ball, or bullet) processing for determining the viewpoint position and line-of-sight direction; processing for reproducing the motion of a moving body; processing for disposing an object within an object space; hit check processing; processing for calculating game score (results); or processing for enabling a plurality of players to play in a common game space; based on factors such as operation data from the operating section 10 and a game program.

The image generation section 150 creates game images in accordance with computations performed by the game computation section 110. The images produced by the image generation section 150 are displayed on a display section 12.

The sound generation section 160 performs processing for generating game sounds in accordance with computations performed by the game computation section 110. The game sounds created by the sound generation section 160 are output by a sound output section 14.

The game computation section 110 comprises a moving body computation section 112, a hit check section 114, a target information processing section 116, and a fragmentation processing section 118.

In this example, the moving body computation section 112 executes computations for causing the movements of a moving body that is manipulated by the player and a moving body having movements that are controlled by a given control program (computer) within an object space (for a three-dimensional game) or a two-dimensional plane (for a two-dimensional game), based on the operation data that is input from the operating section 10 and a given program. More specifically, it performs computations to obtain the position and direction of each moving body for each frame (1/60second), for example.

Assume, by way of example, that the position of a moving body in a (k−1)th frame is $PM_{k-1}$, its velocity is $VM_{k-1}$, its acceleration is $AM_{k-1}$, and the time of one frame is $\Delta t$. In that case, the position $PM_k$ and velocity $VM_k$ of that moving body in the kth frame can be obtained from the following equations:

$$PM_k = PM_{k-1} + VM_{k-1} \times \Delta t \qquad (1)$$

$$VM_k = VM_{k-1} + AM_{k-1} \times \Delta t \qquad (2)$$

The hit check section 114 performs processing to check whether or not each shot has hit a target (target object). In other words, when a player presses a firing button, a shot is fired from the corresponding moving body and the moving body computation section 112 obtains the position and direction of that shot for each frame. When that happens, the hit check section 114 determines whether or not the shot has hit the target, based on the position and direction of the shot and the target that have been calculated by the moving body computation section 112. If the shot has hit the target, processing for an explosion effect or the like is then performed. If the shot has not hit the target, on the other hand, processing to erase the shot is performed. Note that it is also possible to prepare a simple object that is a simplified version of the shape of the target, and perform a hit check between this simple object and the shot.

If the shot has hit the target, the target information processing section 116 performs processing to cause the position, direction, color, and shape of the target to change. In other words, if the player has succeeded in attacking the target, information for identifying which player has succeeded in attacking that target (attacking player identification information) is associated with that target and is saved in a target information storage section (target buffer) 182. For example, the color of a target which a player has succeeded in attacking changes to a symbolic color that has been assigned to that player, and information concerning that color is saved in the target information storage section 182 within the storage section 180. Alternatively, the shape of a target which a player has succeeded in attacking could change to a symbolic shape that has been assigned to that player, and information concerning that shape could be saved in the target information storage section 182. This ensures that the players can perceive which player has succeeded in attacking which target, in a simple manner. Note that information relating to a bullet (or shot in the broadest sense) is stored in a bullet information storage section (bullet buffer) 184 within the storage section 180.

If a given fragmentation condition is satisfied, the fragmentation processing section 118 performs processing to fragment the target that the player attacked. In such a case, the attacking player identification information is associated with child targets created by the fragmenting, and is saved in the target information storage section 182.

Note that the game machine of this embodiment of the invention is configured to enable both games in a single-player mode that are played by one player and games in a multi-player mode that are played by a plurality of players.

If a plurality of players are playing, the game images and game sounds that are supplied to these players could be created by using one game machine, or they could be created by using a plurality of game machines that are connected by means such as transmission lines or communications lines.

2. Outline of Game

The description now turns to an outline of a game that is implemented by this embodiment of the invention, with reference to examples of game images shown in FIGS. 2A to 3B.

Figure 2A:
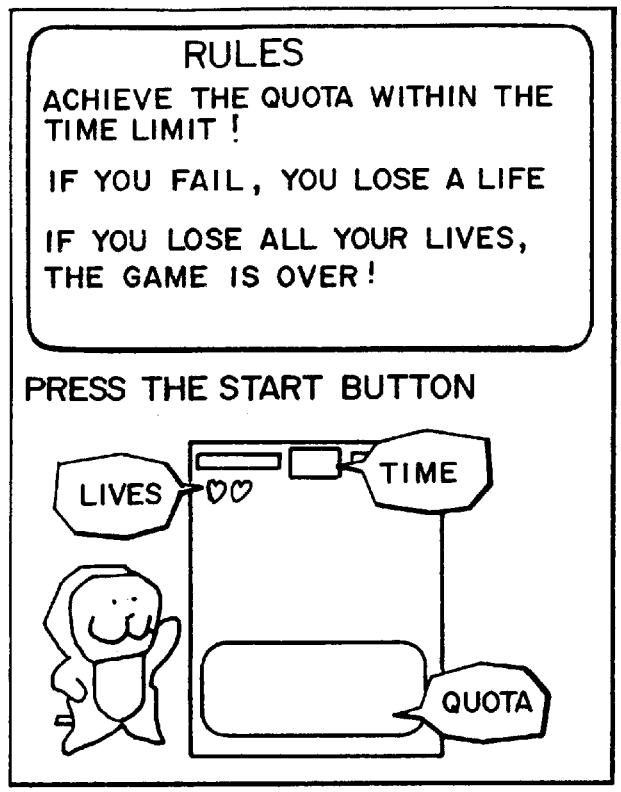
FIGS. 2A and 2B show examples of game images that are generated by this embodiment of the invention.

When a player inserts a coin (or fee in the broadest sense) a screen that explains the rules of the game is first displayed, as shown in FIG. 2A. In the variety game pack of this embodiment of the invention, each player is required to achieve a quota within a certain time, and the number of lives held by that player is decreased by one if that quota is not met. When the number of lives reaches zero, the game is over for that player.

Figure 2B:
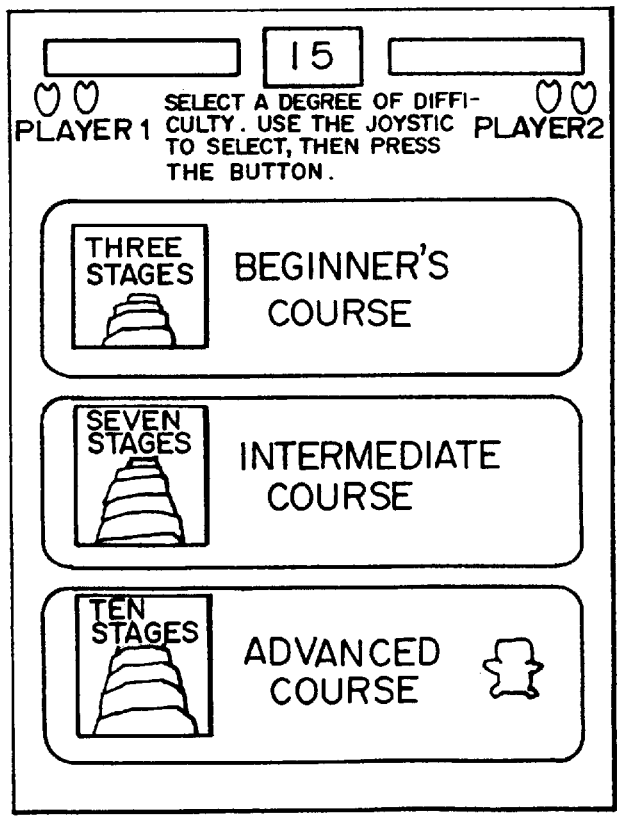

When the player presses a start button, a course (degree of difficulty) selection screen is displayed, as shown in FIG. 2B. This variety game pack is setup in such a manner that players can select any one of a beginners' course that has the lowest degree of difficulty, an intermediate course that has a medium degree of difficulty, or an advanced course that has the greatest degree of difficulty.

Figure 3A:
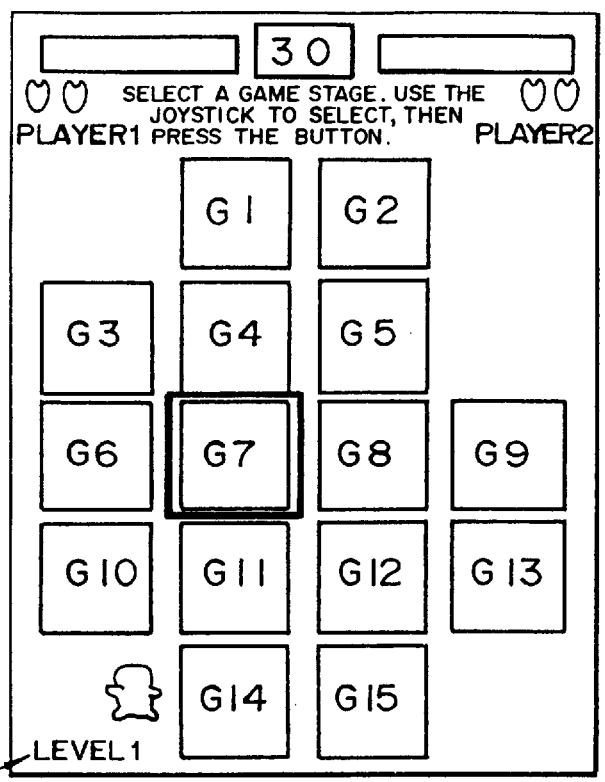
FIGS. 3A and 3B show further examples of game images generated by this embodiment of the invention.
Figure 3B:
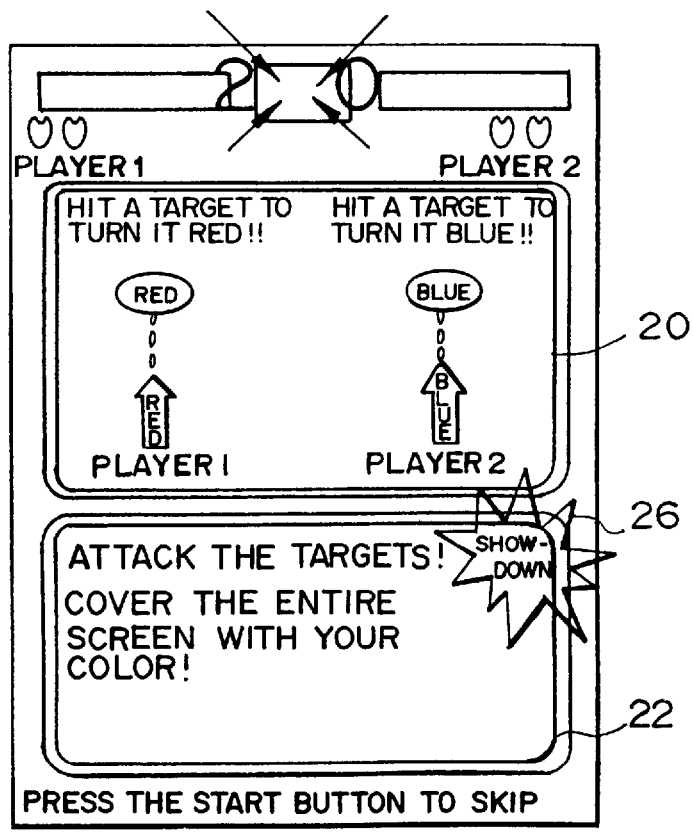

When the players select a course (degree of difficulty) a game stage (mini-game) selection screen is displayed, as shown in FIG. 3A. While viewing the game stage selection screen, the players use means such as a joystick or button to select a desired game stage from among a plurality of game stages (G1 to G15) (G7 is selected in FIG. 3A).

Once the players have selected a game stage, a screen explaining the conditions for clearing the selected game stage (an instruction mode screen) is displayed. The players are required to attack targets, thereby staining the screen with the symbolic colors of each player, as described in explanatory screens 20 and 22 of FIG. 3B. For example, a target that is hit by a shot from a player 1 turns red and a target that is hit by a shot from a player 2 turns blue. This game stage forms a competitive (confrontational) game shown on a display 26, wherein the player who stains the most targets in that player's own symbolic color, wins.

After the display of the screens that explain the conditions for clearing the game stage, the players start playing the game in that game stage.

3. Characteristics of this Embodiment

This embodiment of the invention is characterized in that, when players have attacked a target, information for identifying which player has succeeded in attacking that target (attacking player identification information) is associated with that target and is kept and saved (preserved).

Figure 4A:
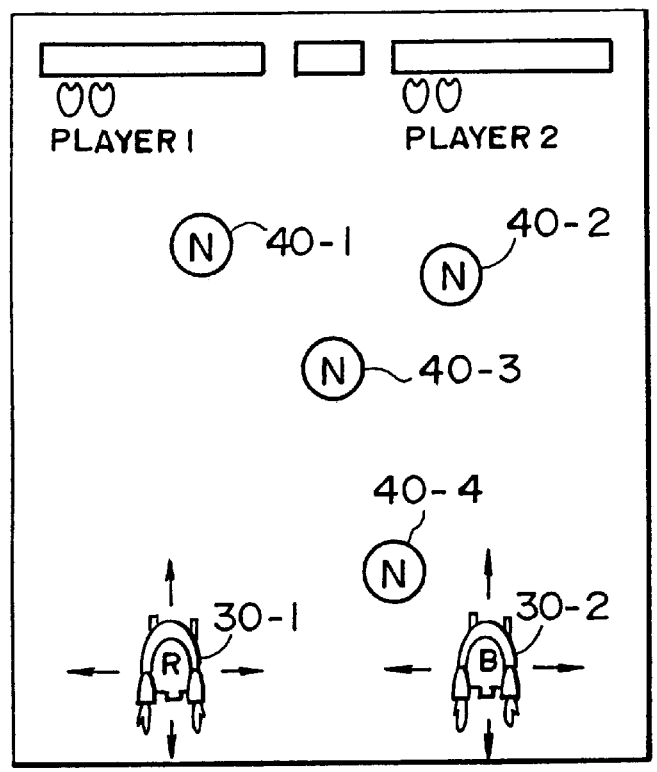
FIGS. 4A and 4B are illustrative of a characteristic of this embodiment of the invention.

Assume, for example, that player 1 is operating a moving body 30-1 and player 2 is operating a moving body 30-2, as shown in FIG. 4A. They launch attacks against targets 40-1, 40-2, 40-3, and 40-4 that move under the control of a computer. If a shot 32-1 from the moving body 30-1 of player 1 hits the target 40-1, the color of the target 40-1 changes from a neutral color (N) to red (R), which is the symbolic color of player 1, by way of example. In other words, color information for red (the symbolic color for player 1), which indicates that player 1 has succeeded in attacking the target 40-1, is associated with the target 40-1 and is kept and saved as attacking player identification information.

Similarly, if a shot 32-2 from the moving body 30-2 of player 2 hits the target 40-2, the color of the target 40-2 changes from a neutral color (N) to blue (B), which is the symbolic color of player 2, by way of example. In other words, color information for blue (the symbolic color for player 2) which indicates that player 2 has succeeded in attacking the target 40-2, is associated with the target 40-2 and is kept and saved as attacking player identification information.

Figure 4B:
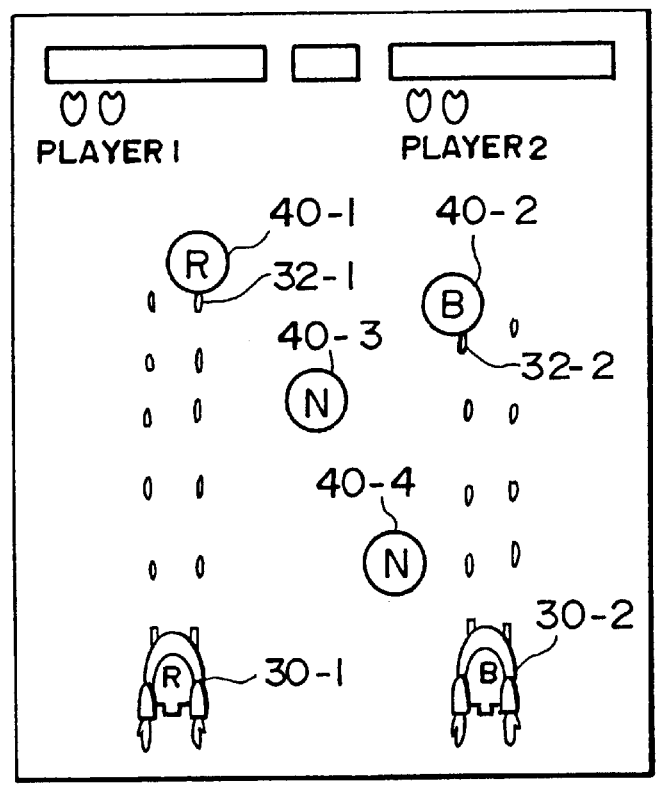

As is shown in FIGS. 4A and 4B, the configuration is such that the players can easily perceive which player has succeeded in attacking which target. In other words, in this type of game machine, it is usual to fire wildly at targets in order to increase each player's own game score. It is therefore possible, to a certain extent, to perceive which of the players has fired a shot at the instant at which that shot has hit the target, but it is not possible to perceive which player had hit which target after a short time has elapsed. In particular, if the targets are moving arbitrarily, as shown in FIGS. 4A and 4B, this identification becomes even more difficult.

Figure 5:
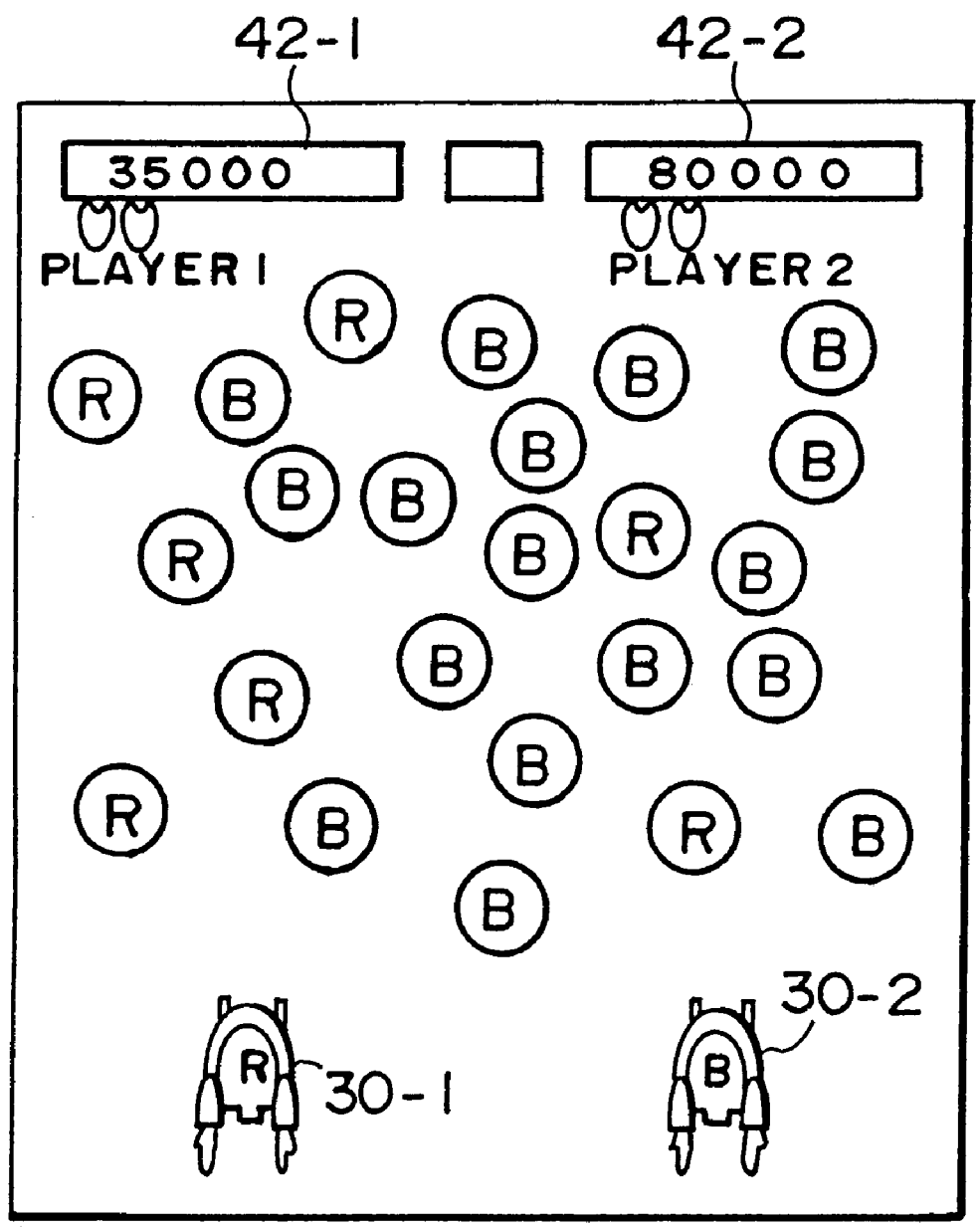
FIG. 5 is illustrative of changing the color of a target.

With this embodiment of the invention, attacking player identification information that indicates which of players 1 and 2 has succeeded in attacking the target is associated with that target and is kept and saved. For example, if a target has been hit by a shot from player 1, that target changes color to red (R) which is the symbolic color of player 1, and if a target has been hit by a shot from player 2, that target changes color to blue (B) which is the symbolic color of player 2, as shown in FIG. 5. It is therefore possible to perceive which of players 1 and 2 has won, in an intuitive visual manner, without looking at scores 42-1 and 42-2. In other words, it is clear from viewing the screen of FIG. 5 that there are more targets stained blue (B) This makes it possible to perceive immediately and in an intuitive manner that player 2, who has the symbolic color blue (B), has won. It is also possible to obtain a visual effect that could not be obtained up to now, by dying the targets red or blue.

Note that the attacking player identification information has been described above as being colors, as shown in FIGS.

Figure 6A:
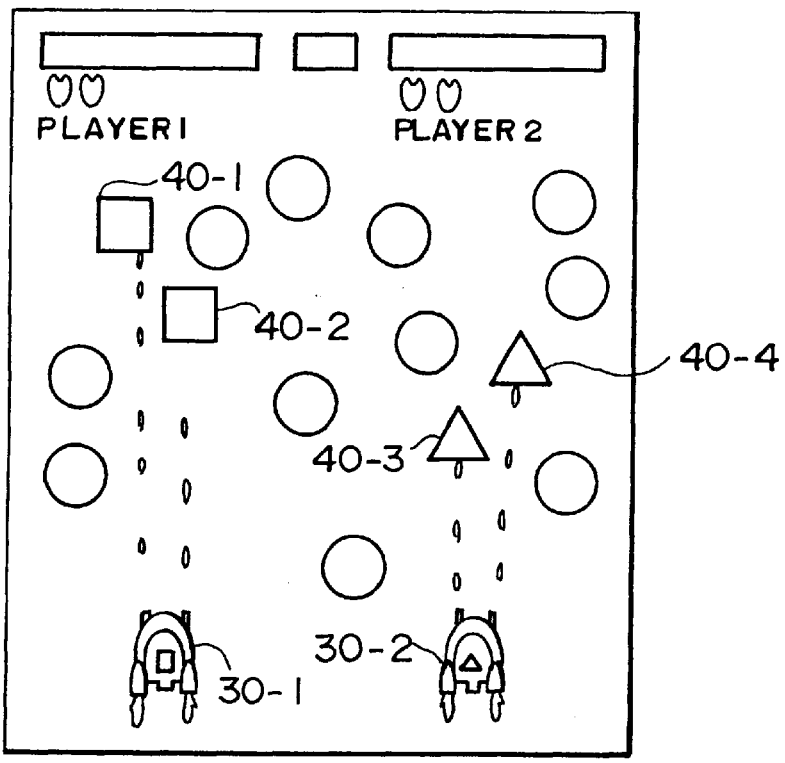
FIGS. 6A and 6B are illustrative of changing the shapes of targets to the players' symbolic shapes or attaching players' symbolic marks to the targets.

4A, 4B, and 5, but it is possible to consider various forms of information other that colors. For example, the configuration could be such that the shape of a target which a player has succeeded in attacking changes to a symbolic shape that has been assigned to that player. The symbolic shape for player 1 who is manipulating the moving body 30-1 could be a rectangle and the symbolic shape for player 2 who is manipulating the moving body 30-2 could be a triangle, as shown in FIG. 6A by way of example. In such a case, the targets 40-1 and 40-2 that have been hit by shots from the moving body 30-1 change shape to the rectangle that is the symbolic shape of player 1. Similarly, targets 40-3 and 40-4 that have been hit by shots from the moving body 30-2 change shape to the triangle that is the symbolic shape of player 2. This configuration makes it possible for each player to perceive that player's own game score immediately and in an intuitive manner, simply by looking to verify the number of targets that have changed shape to the players' own symbolic shapes. Note that the configuration could be such that only part of the targets change shape to the player's symbolic shape.

Figure 6B:
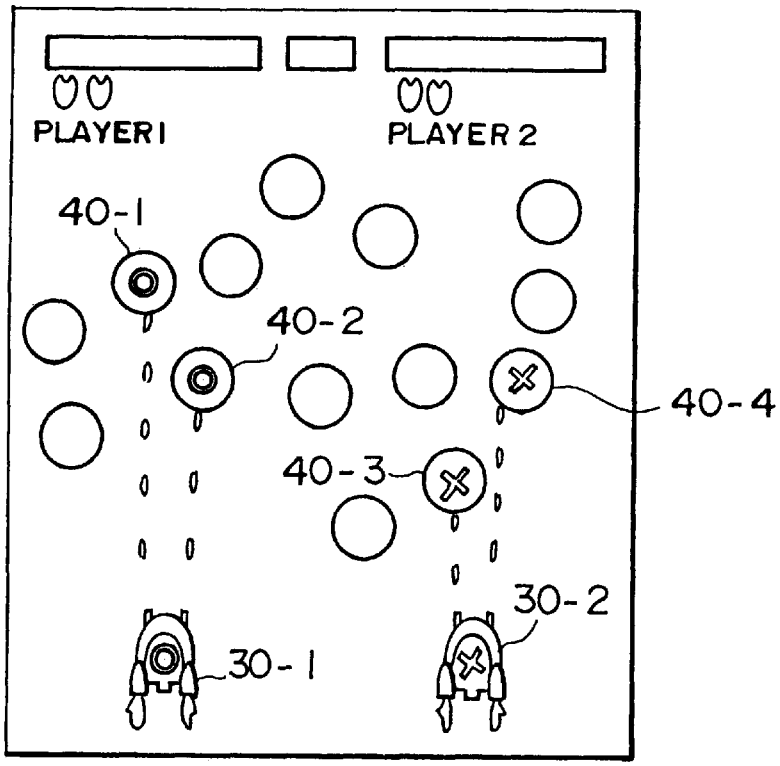

Alternatively, the configuration could be such that a symbolic mark for player 1 is a circle and the symbolic mark for player 2 is a cross, as shown in FIG. 6B. In this case, the targets 40-1and 40-2 that have been hit by shots from the moving body 30-1 acquire the circle that is the symbolic mark for player 1. Similarly, the targets 40-3 and 40-4 that have been hit by shots from the moving body 30-2 acquire the cross that is the symbolic mark for player 2.

This embodiment of the invention can also be set up in such a manner that, if player 1 has succeeded in attacking a target and then player 2 also has succeeded in attacking the same target, the attacking player identification information for player 2 is associated with that target and is kept and saved. In an example shown in FIG. 7A, the shot 32-1 from the moving body 30-1 manipulated b y player 1 has hit the target 40 and the color of the target 40 has changed to the red that is the symbolic color of player 1. The target 40 that has been colored with this red then moves and the shot 32-2 from the moving body 30-2 manipulated by player 2 hits the target 40, as shown in FIG. 7B. In this case, the color of the target 40 switches from the red that is the symbolic color of player 1 to the blue that is the symbolic color of player 2. If the game is set up in this manner, the colors of the targets will switch in a break-neck fashion between red and blue and the relative game score of the players will also change in a break-neck fashion. As a result, it is possible to achieve a visual effect that could not be obtained until now, and also increase the player's degree of absorption in the game.

Figure 8A:
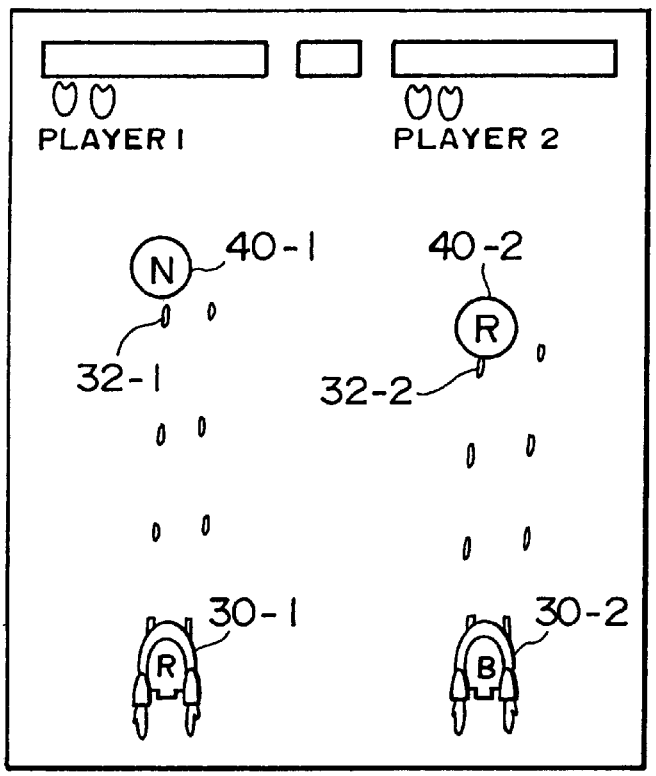
FIGS. 8A and 8B are illustrative of causing a target to fragment after being hit by a shot from a player.
Figure 8B:
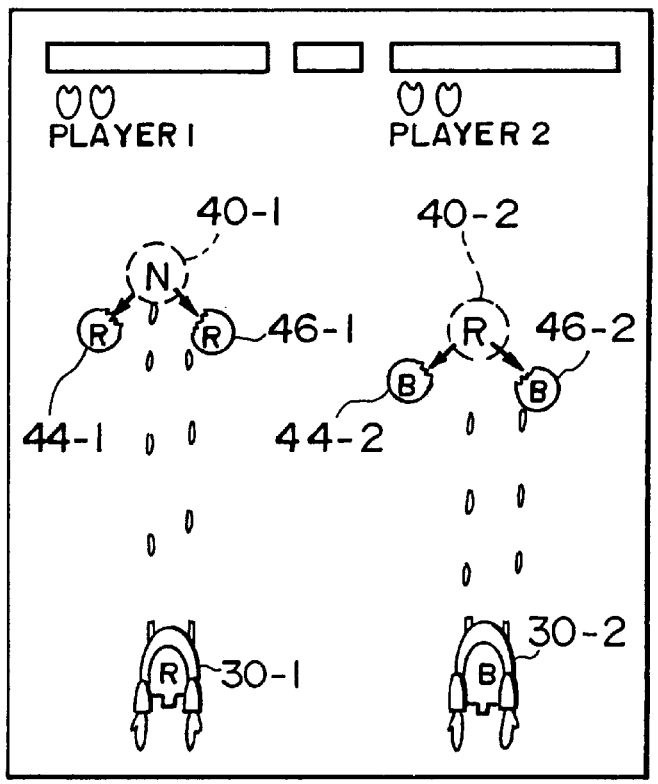

In this embodiment of the invention, the configuration could be such that a target which a player has succeeded in attacking is made to fragment and attacking player identification information is kept and saved and associated with a target created by fragmentation. For example, assume that the shot 32-1 from the moving body 30-1 of player 1 hits the target 40-1 which has the neutral color (N) and the shot 32-2 from the moving body 30-2 of player 2 hits the target 40-2 which is red (R) because that target 40-2 had been hit previously by a shot from the moving body 30-1, as shown in FIG. 8A. In this case, the parent target 40-1 is made to fragment into child targets 44-1 and 46-1 and parent target 40-2 is made to fragment into child targets 44-2 and 46-2, as shown in FIG. 8B. The child targets 44-1 and 46-1 change from the neutral color to the red that is the symbolic color of player 1 and the child targets 44-2 and 46-2 change from the red that is the symbolic color of player 1 to the blue that is the symbolic color of player 2. In other words, each parent target passes on its attacking player identification information to its child targets. If a target fragments in this manner, the number of targets on the screen will increase as the players' attacks continue, enabling an increase in the visual effect of the game image. In this case, the configuration is such that the targets increase as their colors switch between red and blue. The visual effect of the game images can be increased even further thereby. Note that, when each target fragments, the parent target could either disappear or remain.

Figure 9A:
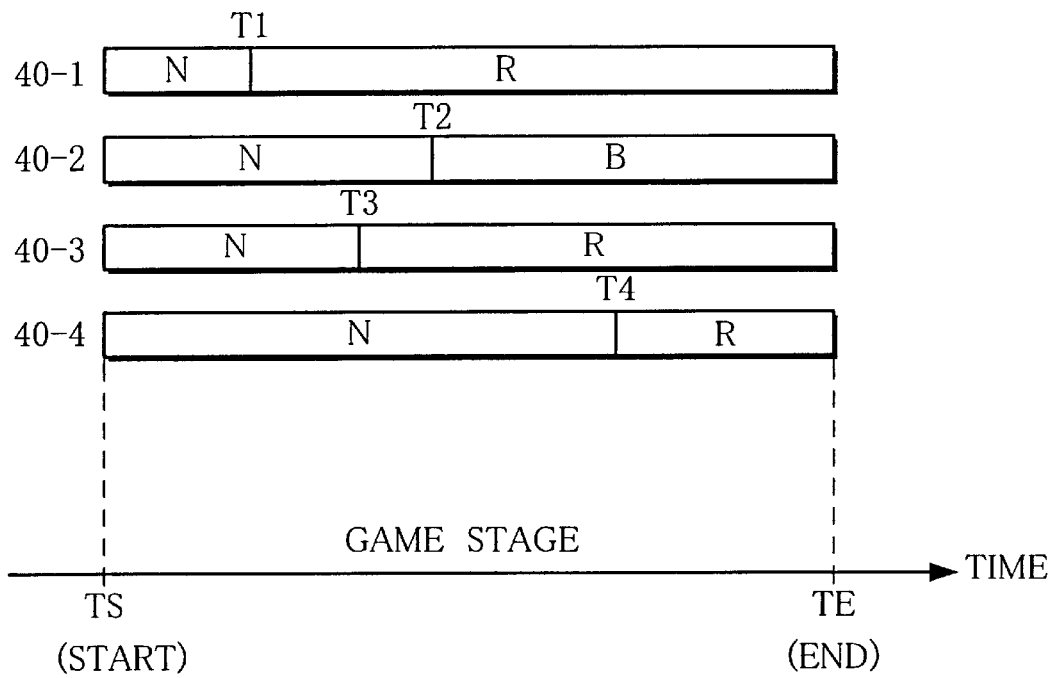
FIGS. 9A and 9B are illustrative of keeping and saving the attacking player identification information until a game stage has ended.

It should also be noted that the attacking player identification information is preferably associated with each target and is kept and saved until one game stage is completed. For example, assume that the color of the target 40-1 changes from the neutral color (N) to red (R) at a time T1, as shown in FIG. 9A. This red is preserved until a time TE at which the game stage ends. The colors of the targets 40-2, 40-3, and 40-4 change at the times T2, T3, and T4, respectively, and the colors after the change are kept and saved until the time TE at which the game stage ends.

Figure 7A:
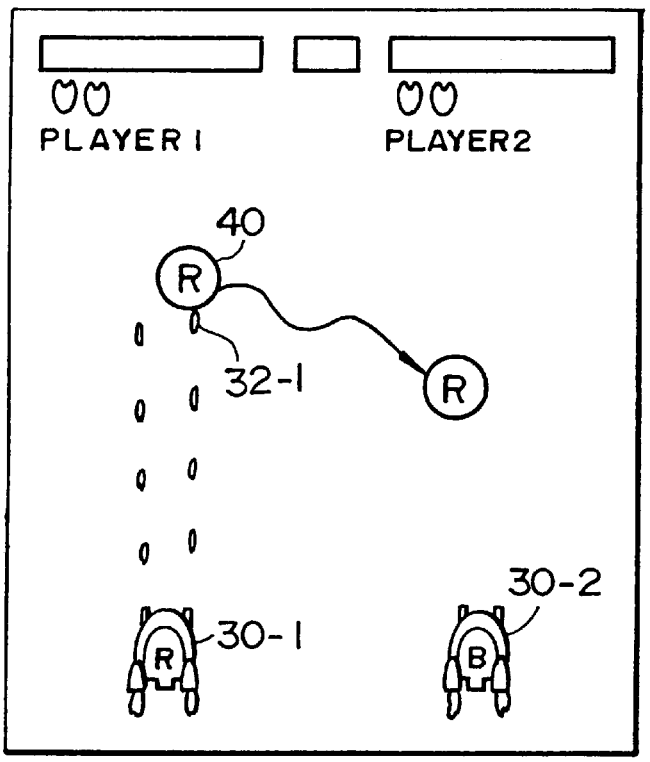
FIGS. 7A and 7B are illustrative of switching the color of a target when a shot from one player has hit and then a shot from another player has hit.
Figure 7B:
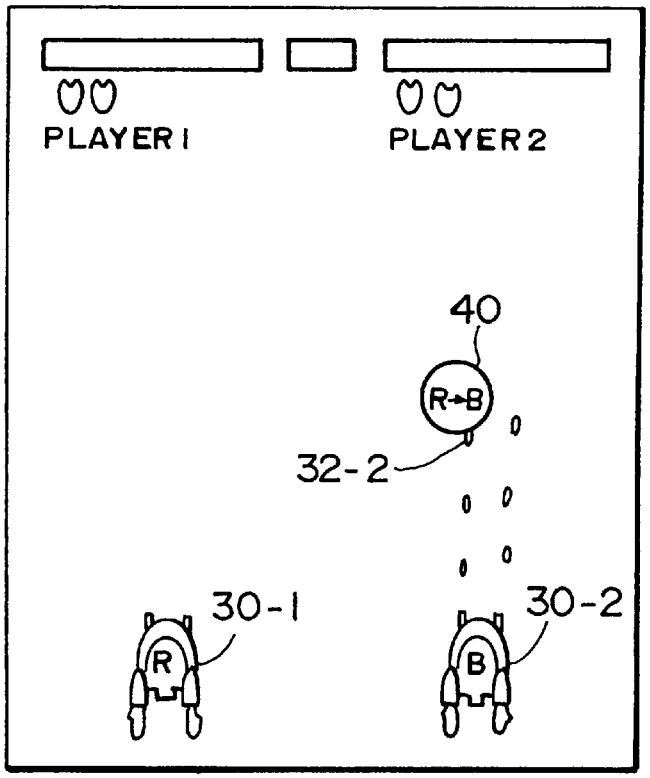
Figure 9B:
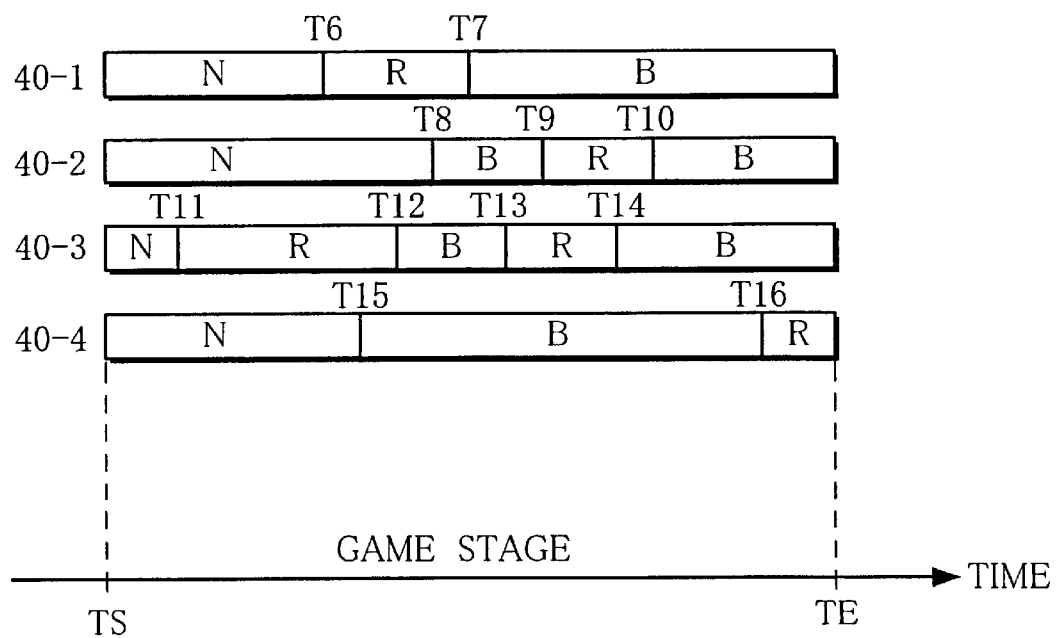

A case in which the colors of targets switch in answer to attacks from the players, as shown in FIGS. 7A and 7B, is shown in FIG. 9B. For example, the color of the target 40-1 changes from the neutral color to red at a time T6, then changes from red to blue at T7. This blue is kept and saved until the time TE at which the game stage ends. The targets 40-2, 40-3, and 40-4 change color in a similar manner.

If the attacking player identification information is kept and saved until the time at which the game stage ends in this manner, this attacking player identification information can be used to indicate the game scores achieved by the players within the game stage, when that game stage ends. In the example shown in FIG. 9A, the colors of the targets 40-1, 40-2, 40-3, and 40-4 at the time TE at which the game stage ends are red, blue, red, and red, respectively. It is therefore possible for the players to perceive immediately that player 1, whose symbolic color is red, has won, by seeing on the screen that a larger number of targets have become red.

4. Detailed Processing Example

Figure 10:
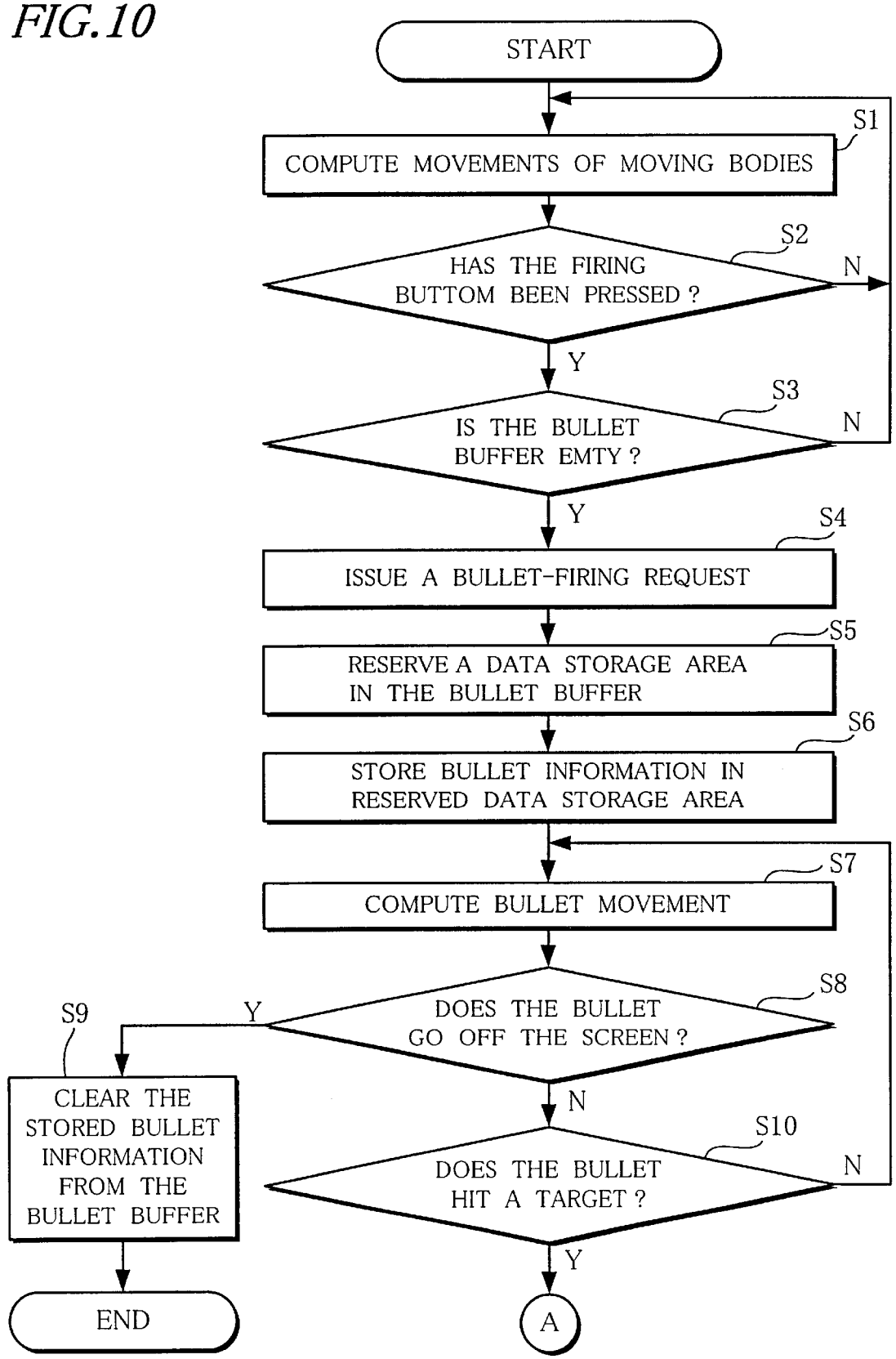
FIG. 10 shows a typical flowchart of a detailed example of processing in accordance with this embodiment of the invention.

A detailed example of the processing of this embodiment of the invention will now be described with reference to the flowcharts shown in FIGS. 10 and 11.

First of all, movement computations (computations for obtaining the position and direction of each moving body) are performed, based on operation data from the player and a game program (step S1). These movement computations are performed for each frame by the moving body computation section 112 of FIG. 1, by way of example.

The system then determines whether or not a firing button of the operating section 10 has been pressed by the player (step S2). If it has not been pressed, the flow returns to step S1. If it has been pressed, on the other hand, the system determines whether or not the bullet buffer (bullet information storage section) 184 of FIG. 1 is empty (step S3). If it is not empty (if there are no bullets remaining), the flow returns to step S1. If it is empty, on the other hand, a bullet-firing request is issued (step S4). A data storage area is then reserved in the bullet buffer 184 and information for this bullet is stored in the reserved data area (step S6).

Bullet movement computations are then executed (step S7). These bullet movement computations are performed by the moving body computation section 112 of FIG. 1 for each frame, by way of example. The system then determines whether or not the bullet will go outside of the screen (step S8) and, if it will go outside, it clears the information on the bullet that is stored in the bullet buffer 184 (step S9). If the bullet will not go outside, on the other hand, the system determines whether or not the bullet hits a target (step S10). If it does not hit the target, the flow returns to step S7. Note that the hit check between the bullet and each target is performed by the hit check section 114 of FIG. 1.

Figure 11:
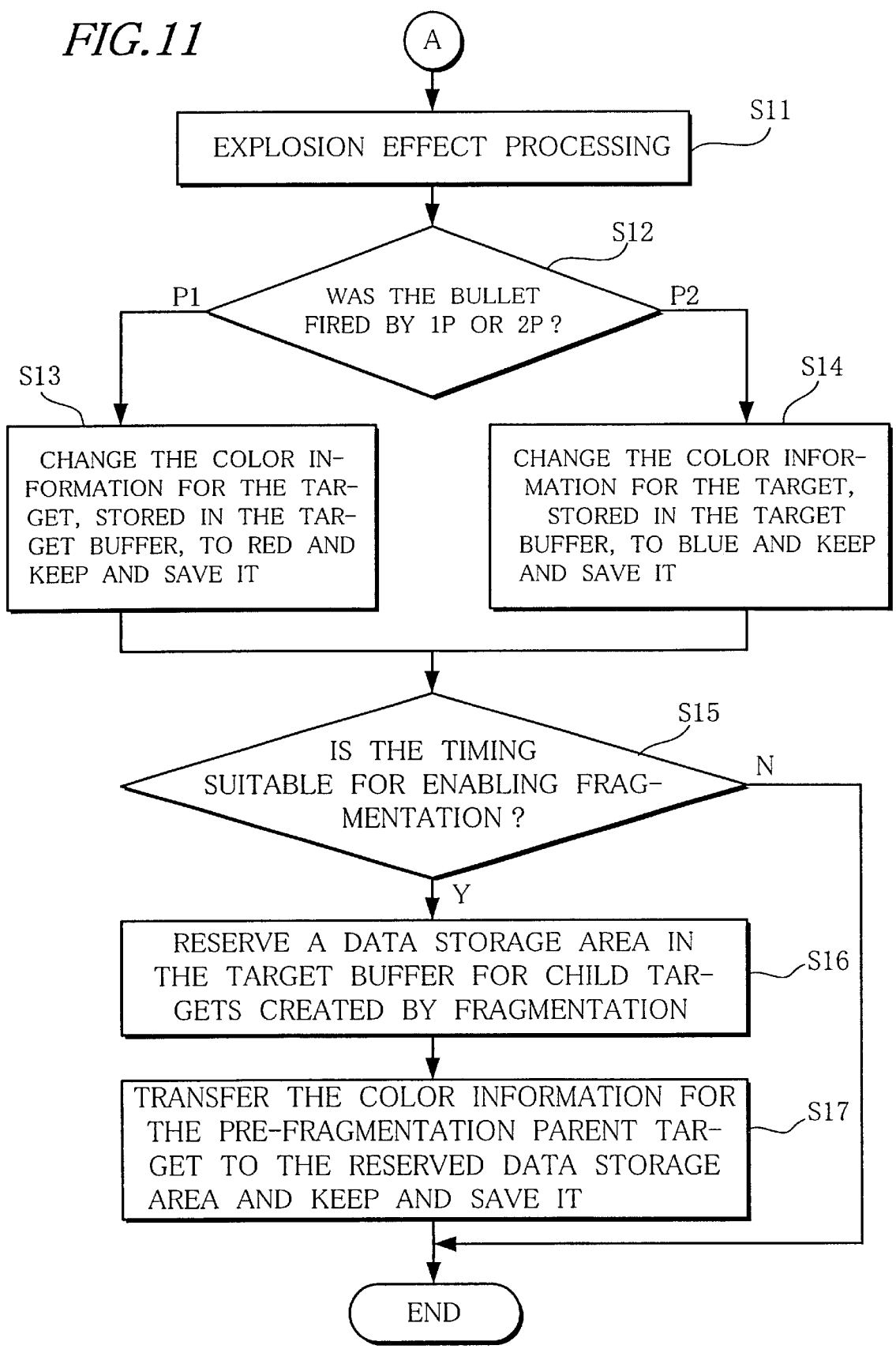
FIG. 11 continues the typical flowchart of the detailed example of processing in accordance with this embodiment of the invention.

If it is determined instep S10 that the bullet hits a target, processing for an explosion effect is performed (step S11 of FIG. 11). The system then determines which of players 1 and 2 fired the bullet that hit the target (step S12). If it is determined that player 1 fired that bullet, color information for the target that is stored in the target buffer 182 is changed to the red that is the symbolic color of player 1 and is kept and saved (step S13). If it is determined that player 2 fired that bullet, on the other hand, color information for the target that is stored in the target buffer 182 is changed to the blue that is the symbolic color of player 2 and is kept and saved (step S14). This configuration makes it possible to associate attacking player identification information, which indicates which player has attacked which target, with the target and keep and save it.

The system then determines whether or not the timing is suitable to enable fragmentation of the target (whether or not a fragmentation condition has been satisfied) (step S15). For example, if a given time has not elapsed after the previous fragmentation, the target will not fragment even if hit by a bullet. If this timing is suitable to enable fragmentation of the target, a data storage area for the child targets created by the fragmentation (the targets 44-1, 46-1, 44-2, and 46-2 of FIG. 8B) is reserved in the target buffer 182 (step S16). Color information for the parent targets before the fragmentation (the targets 40-1 and 40-2 of FIG. 8B) is then transferred (stored) to the reserved data area and is kept and saved(step S17). This configuration makes it possible for color information for the parent targets to be transferred to child targets.

5. Hardware Configuration

Figure 12:
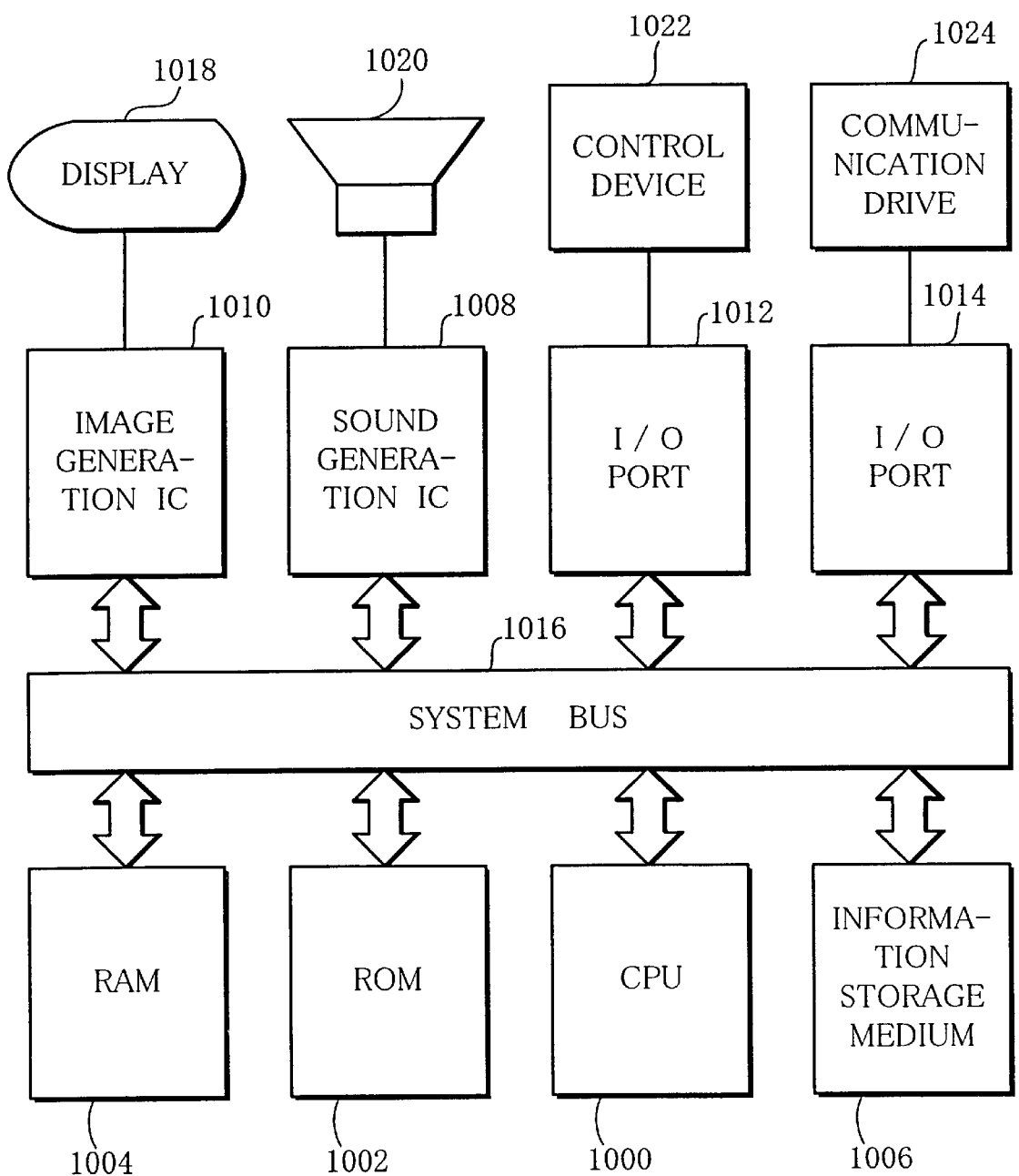
FIG. 12 shows an example of the configuration of hardware that can implement this embodiment of the invention.

The description now turns to an example of hardware that can implement this invention, with reference to FIG. 12. In the apparatus shown in this figure, a CPU 1000, ROM 1002, RAM 1004, an information storage medium 1006, a sound generation IC 1008, an image generation IC 1010, and I/O ports 1012 and 1014 are connected together by a system 1016 in such a manner that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

The information storage medium 1006 is mainly used for storing program and image data, sound data, or the like for representing display objects. Means such as a CD-ROM, game cassette, or DVD could be used as an information storage medium for storing a game program and other data for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire system and processes data in accordance with the program stored in the information storage medium 1006, a system program stored in the ROM 1002 (including initialization information for the entire system), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data configuration having a logical structure suitable for implementing this embodiment of the invention is constructed within this RAM or information storage medium.

The provision of the sound generation IC 1008 and the image generation IC 1010 in this type of system makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could also be used as the display 1018.

The communications device 1024 is designed to transfer various types of information used within the game system to and from external devices, and it is used to send and receive given information in accordance with a game program when connected to another game system, or to send and receive information such as a game program over a communications line.

The processing described with reference to FIGS. 1 to 9B is implemented by components such as the information storage medium 1006 that contains a program that performs the processing shown in the flowcharts of FIGS. 10 and 11, the CPU 1000 that operates in accordance with that program, and the image generation IC 1010 or the sound generation IC 1008. Note that the processing executed by the image generation IC 1010 and the sound generation IC 1008 could be performed in a software manner by means such as the CPU 1000 or an ordinary DSP.

Figure 13A:
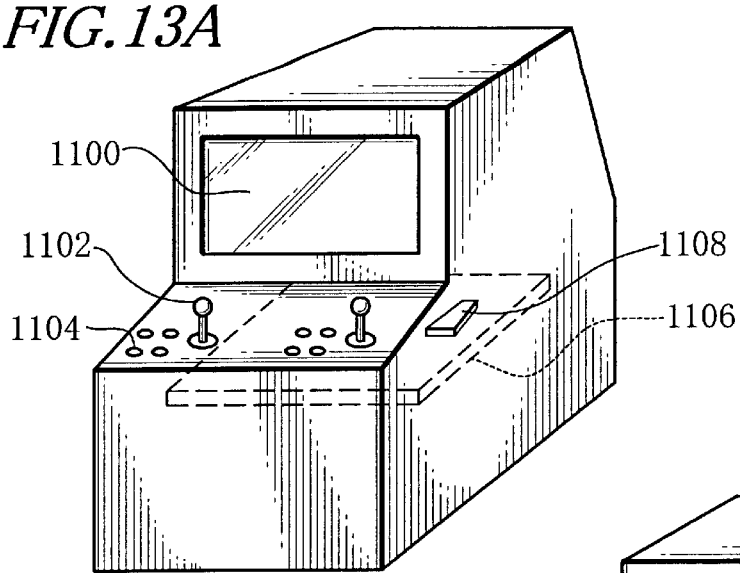
FIGS. 13A to 13C show examples of various devices to which this embodiment of the invention is applied.

An example of this embodiment applied to an arcade game machine is shown in FIG. 13A. A player enjoys this game by operating controls such as a joystick 1102 and buttons 1104 while viewing a game image shown. on a display 1100. Components such as a CPU, an image generation IC, and a sound generation IC are mounted on an IC board 1106 incorporated into the game machine. Information is stored in a memory 1108, which is an information storage medium on the IC board 1106. This information includes information for performing game computations based on operation data that is input by a player using an operation means; information for generating a game image in accordance with the game computations; information that is used when players have launched attacks against a target, for keeping and saving attacking player identification information, which is information for identifying which player has succeeded in attacking the target, associated with the target; and information for changing the color of a target that a player has succeeded in attacking to a symbolic color that has been assigned to that player. This information is hereinafter called stored information. This stored information comprises at least one type of information, such as program coding for executing the above described processing, image information, sound information, shape information for display objects, table data, list data, or player information.

Figure 13B:
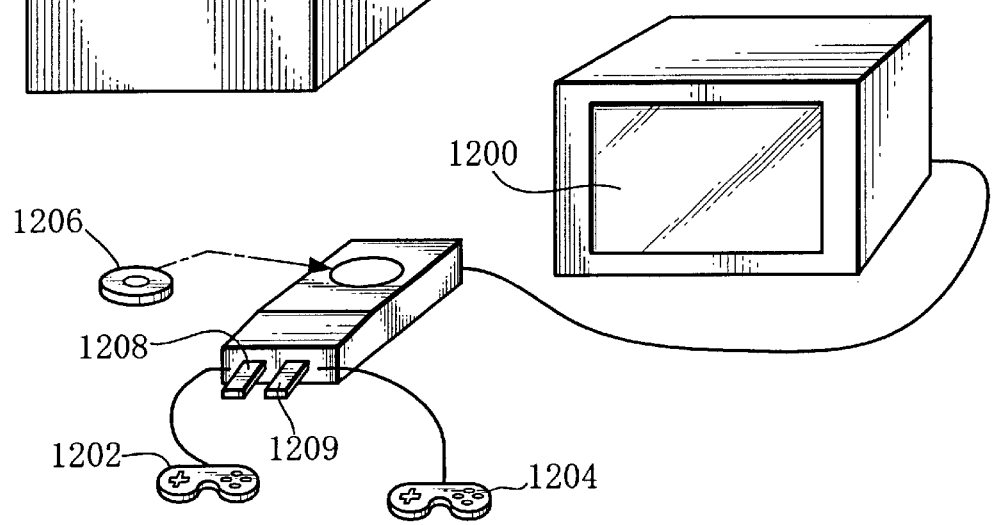

An example of this embodiment applied to a domestic game machine is shown in FIG. 13B. Players enjoy the game by manipulating game controllers 1202 and 1204 while viewing a game image shown on a display 1200. In this case, the above described stored information is stored in a CD-ROM 1206 or IC cards 1208 and 1209, which are information storage media that can be freely inserted into and removed from the main unit.

Figure 13C:
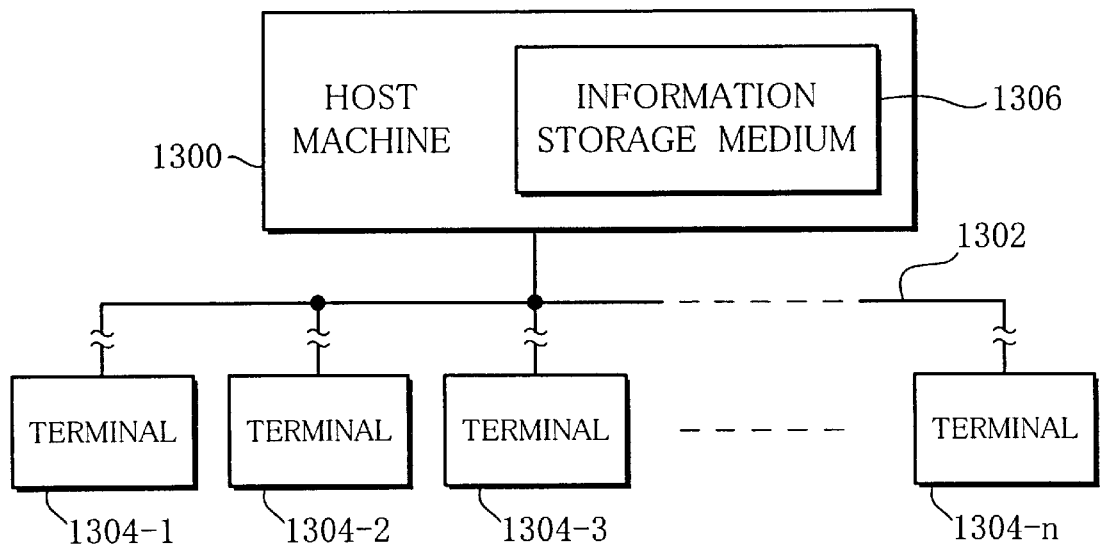

An example of this embodiment applied to a game machine is shown in FIG. 13C where the game machine comprises a host machine 1300 and terminals 1304-1 to 1304-n connected to the host machine 1300 by communications lines 1302. In this case, the above described stored information is stored in an information storage medium 1306 such as a magnetic disk, magnetic tape, or memory that can be controlled by the host machine 1300. Each of the terminals 1304-1 to 1304-n has a CPU, an image generation IC, and a sound processing IC. In addition, if game images and sounds can be generated by the terminals 1304-1 to 1304-n in a stand-alone manner, data such as a game program for generating game images and sounds is transferred thereto from the host machine 1300. On the other hand, if they cannot be generated in a stand-alone manner by the terminals 1304-1 to 1304-n, the host machine 1300 creates the game images and sounds then transfers them to those terminals for output thereby.

Note that this invention is not limited to the above described embodiments and it can be modified in various ways.

For example, the method of associating attacking player identification information with a target and keeping and saving it is most preferably a method of changing the color or shape of each target to a symbolic color or symbolic shape for each player, but it is possible to modify this method in various other ways.

The present invention is not limited to the embodiments described herein and thus it can be applied to various other games such as sports games, hand-to-hand combat games, robot-battling games, competitive weapons games, role-playing games, shooting games, gun games, and puzzle games.

Figure 14:
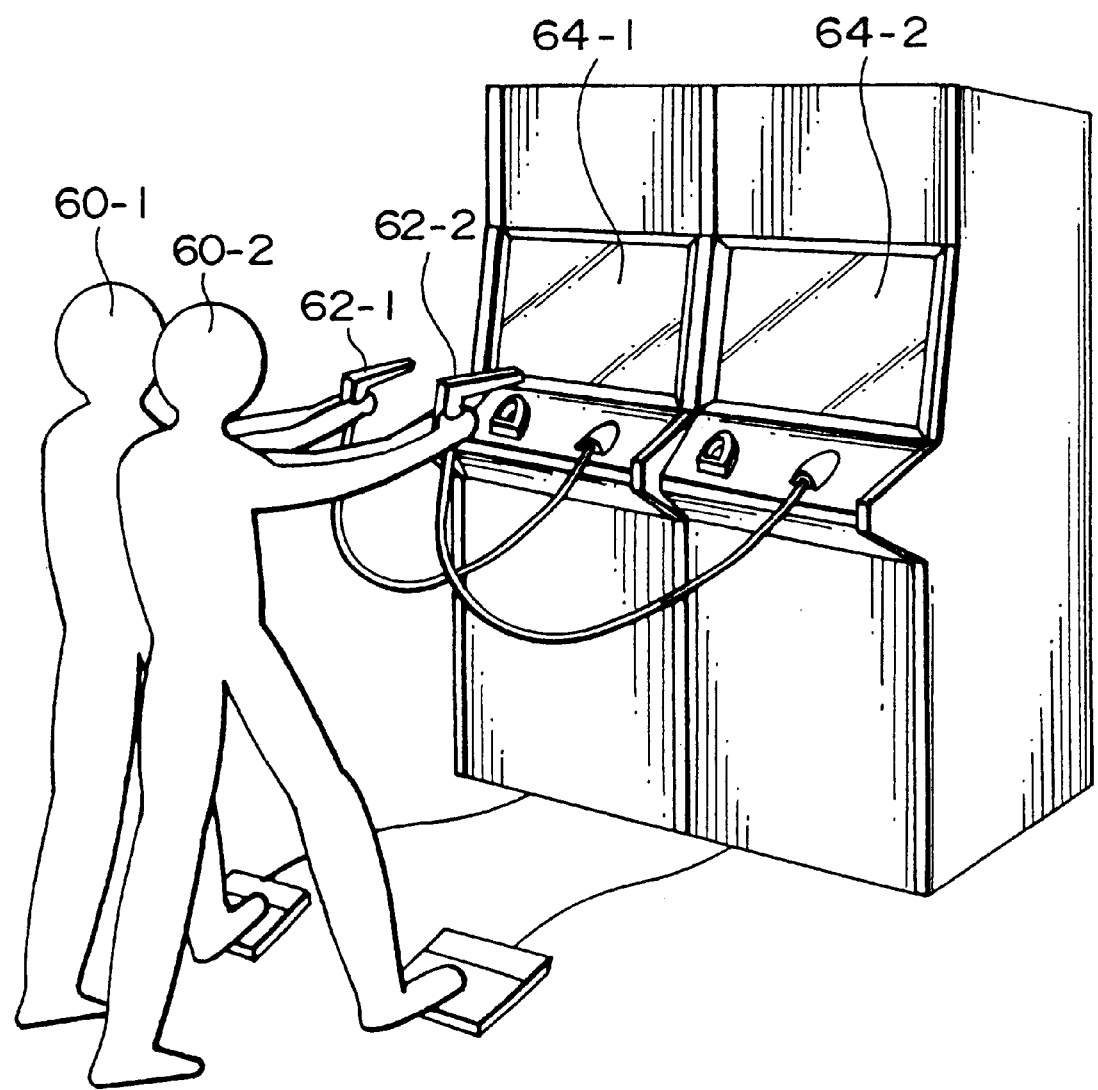
FIG. 14 shows an example of a game machine for a gun game to which this invention is applied.
Figure 15:
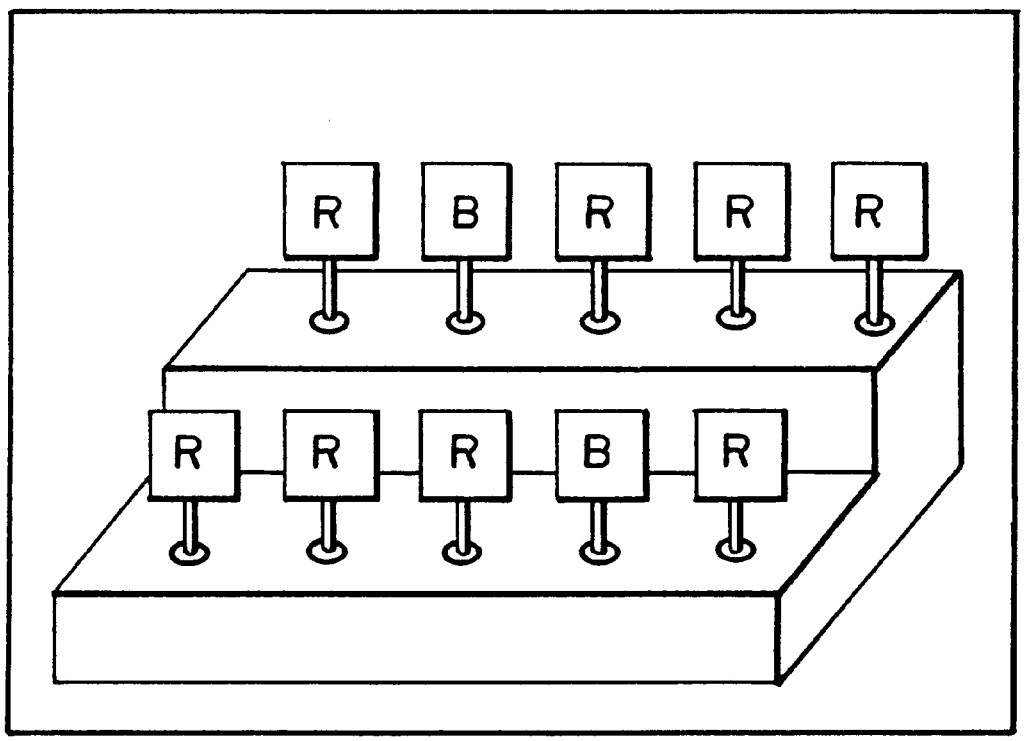
FIG. 15 shows an example of a game image in a gun game.

An example of game machine for a gun game that is shown in FIG. 14 enables players 60-1 and 60-2 to use shooting devices 62-1 and 62-2 that resemble hand-guns to shoot at targets displayed on display sections 64-1 and 64-2, respectively. An example of a game image from this gun game is shown in FIG. 15. If a shot (simulated shot) that was fired by the player 60-1 from the shooting device 62-1 hits a target, the color of that target changes to red (R). Similarly, if a shot fired by the player 60-2 from the shooting device 62-2 hits a target, the color of that target changes to blue (B). The configuration is such that it can be easily seen which of players 60-1 and 60-2 has won at the end of the stage, by checking which targets have been stained which colors, as shown in FIG. 15.

Figure 16:
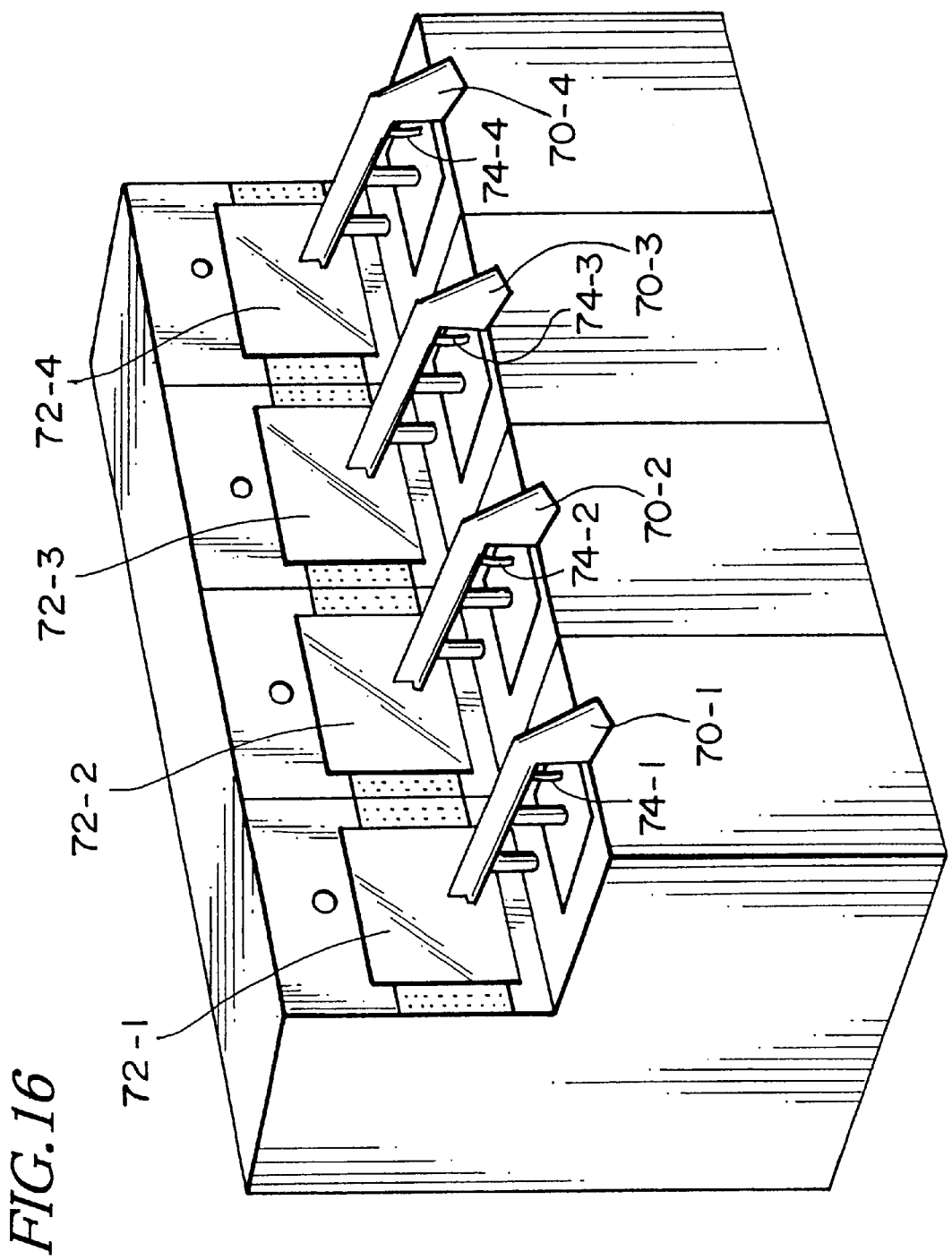
FIG. 16 shows an example of a game machine for a competitive weapons game to which this invention is applied.
Figure 17:
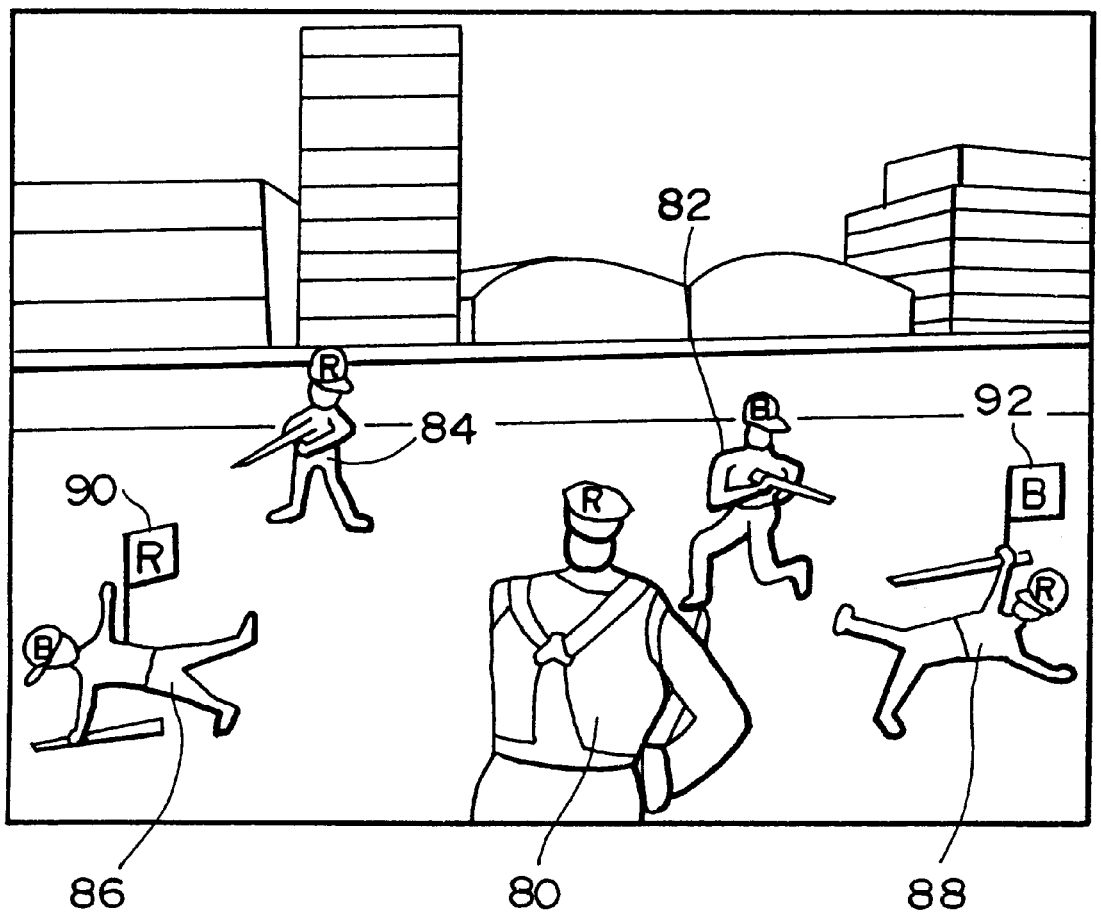
FIG. 17 shows a game image from this competitive weapons game.

Another example of a game machine for a competitive weapons game is shown in FIG. 16, with an example of a game image of this competitive weapons game being shown in FIG. 17. This game machine is provided with shooting devices 70-1, 70-2, 70-3, and 70-4 that resemble machine-guns. Images such as an own character 80 (a character manipulated by the player), an enemy character 82 (a character manipulated by an enemy player or the computer), an allied character 84 (a character manipulated by an allied player or the computer), a map, and background details are shown on display sections 72-1, 72-2, 72-3, and 72-4, as shown in FIG. 7. When a player moves the corresponding one of the shooting devices 70-1 to 70-4 forward/backward/left/right, the own character 80 of that player also moves forward/backward/left/right within an object space (virtual three-dimensional space). The players pull triggers 74-1 to 74-4 that are provided on the shooting devices 70-1 to 70-4 to fire simulated shots, and thus enjoy a gun fight against the enemy character 82 in cooperation with the allied character 84.

In FIG. 17, characters 86 and 88 are characters that have been killed in the gun fight. In this case, attacking player identification information is associated with the characters 86 and 88 and is kept and saved, to make it clear whether each of the characters 86 and 88 was killed by an attack from the own character group (symbolic color: red) or by an attack from the enemy character group (symbolic color: blue). For example, the character 86 that has been killed by the own character group has a red flag 90, or all or part of the character 86 is stained red. Similarly, the character 88 that has been killed by the enemy character group has a blue flag 92, or all or part of the character 88 is stained blue. This configuration makes it possible to induce players to perceive which character has been killed by which group, in a simple manner.

This invention is also not limited to arcade and domestic game machines; it can be applied to various other game systems such as simulators, large-scale attractions in which many players can participate, personal computers, multimedia terminals, and system boards that create game images.

What is claimed is:

1. A game machine for a multi-player type of game in which a plurality of players launch attacks against a target, wherein said game machine comprises:

an input device;

means for performing game computations, based on operation data that a player inputs using the input device;

means for generating a game image in accordance with said game computations; and means, that is used when players have launched attacks against moving and stationary targets by shooting shots at said targets, for continually displaying and saving attacking player identification information, which is information for identifying which player has succeeded in attacking each target of said targets by hitting said target with a shot, associated with said target.

2. The game machine as defined in claim 1, wherein the color of a target which a player has succeeded in attacking changes to a symbolic color that has been assigned to that player.

3. The game machine as defined in claim 2, wherein when one player from among a plurality of players has succeeded in attacking a target and then another player succeeds in attacking said target, only said attacking player identification information for said another player is associated with said target and is continually displayed and saved.

4. The game machine as defined in claim 2, wherein a target which a player has succeeded in attacking is made to fragment and said attacking player identification information is associated with a child target created by fragmentation of the target and is continually displayed and saved.

5. The game machine as defined in claim 2, wherein said attacking player identification information is associated with a target and is continually displayed and saved until one game stage is completed.

6. The game machine as defined in claim 1, wherein the shape of a target which a player has succeeded in attacking changes to a symbolic shape that has been assigned to that player.

7. The game machine as defined in claim 6, wherein when one player from among a plurality of players has succeeded in attacking a target and then another player succeeds in attacking said target, only said attacking player identification information for said another player is associated with said target and is continually displayed and saved.

8. The game machine as defined in claim 6, wherein a target which a player has succeeded in attacking is made to fragment and said attacking player identification information is associated with a child target created by fragmentation of the target and is continually displayed and saved.

9. The game machine as defined in claim 6, wherein said attacking player identification information is associated with a target and is continually displayed and saved until one game stage is completed.

10. The game machine as defined in claim 1, wherein when one player from among a plurality of players has succeeded in attacking a target and then another player succeeds in attacking said target, only said attacking player identification information for said another player is associated with said target and is continually displayed and saved.

11. The game machine as defined in claim 1, wherein a target which a player has succeeded in attacking is made to fragment and said attacking player identification information is associated with a child target created by fragmentation of the target and is continually displayed and saved.

12. The game machine as defined in claim 1, wherein said attacking player identification information is associated with a target and is continually displayed and saved until one game stage is completed.

13. A computer-readable information storage medium for a multi-player type of game wherein a plurality of players launch attacks against targets, said information storage medium comprising:

information for performing game computations, based on operation signals that a player inputs by using an input device;

information for generating a game image in accordance with said game computations; and information that is used when players have launched attacks against moving and stationary targets by shooting shots at said targets, for continually displaying and saving attacking player identification information, which is information for identifying which player has succeeded in attacking a target by hitting said target with a shot, associated with said target.

14. The computer-readable information storage medium as defined in claim 13, wherein the color of a target which a player has succeeded in attacking changes to a symbolic color that has been assigned to that player.

15. The computer-readable information storage medium as defined in claim 14, wherein when one player from among a plurality of players has succeeded in attacking a target and then another player succeeds in attacking said target, said attacking player identification information for said another player is associated with said target and is continually displayed and saved.

16. The computer-readable information storage medium as defined in claim 14, wherein a target which a player has succeeded in attacking is made to fragment and said attacking player identification information is associated with a child target created by fragmentation of the target and is continually displayed and saved.

17. The computer-readable information storage medium as defined in claim 14, wherein said attacking player identification information is associated with a target and is continually displayed and saved until one game stage is completed.

18. The computer-readable information storage medium as defined in claim 13, wherein the shape of a target which a player has succeeded in attacking changes to a symbolic shape that has been assigned to that player.

19. The computer-readable information storage medium as defined in claim 18, wherein when one player from among a plurality of players has succeeded in attacking a target and then another player succeeds in attacking said target, said attacking player identification information for said another player is associated with said target and is continually displayed and saved.

20. The computer-readable information storage medium as defined in claim 18, wherein a target which a player has succeeded in attacking is made to fragment and said attacking player identification information is associated with a child target created by fragmentation of the target and is continually displayed and saved.

21. The computer-readable information storage medium as defined in claim 18, wherein said attacking player identification information is associated with a target and is continually displayed and saved until one game stage is completed.

22. The computer-readable information storage medium as defined in claim 13, wherein when one player from among a plurality of players has succeeded in attacking a target and then another player succeeds in attacking said target, said attacking player identification information for said another player is associated with said target and is continually displayed and saved.

23. The computer-readable information storage medium as defined in claim 13, wherein a target which a player has succeeded in attacking is made to fragment and said attacking player identification information is associated with a child target created by fragmentation of the target and is continually displayed and saved.

24. The computer-readable information storage medium as defined in claim 13, wherein said attacking player identification information is associated with a target and is continually displayed and saved until one game stage is completed.

* * * * *